Aug. 23, 1966   R. D. BOONE   3,268,174
IRRIGATION SYSTEM
Filed Sept. 27, 1963   5 Sheets-Sheet 1

RALPH D. BOONE
INVENTOR.

BY

Aug. 23, 1966  R. D. BOONE  3,268,174
IRRIGATION SYSTEM
Filed Sept. 27, 1963  5 Sheets-Sheet 2

RALPH D. BOONE
INVENTOR.

Aug. 23, 1966 R. D. BOONE 3,268,174
IRRIGATION SYSTEM
Filed Sept. 27, 1963 5 Sheets-Sheet 3

RALPH D. BOONE
INVENTOR.

BY *[signature]*
Atty.

RALPH D. BOONE
INVENTOR.

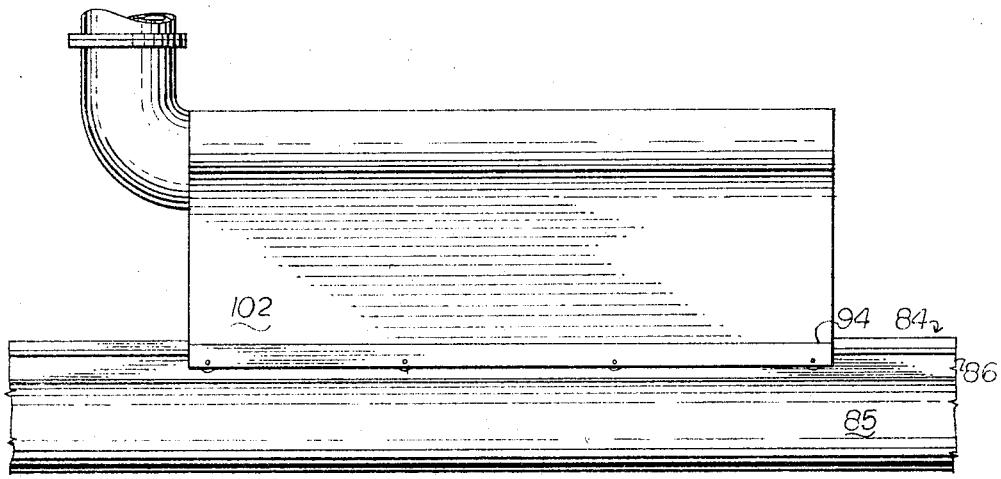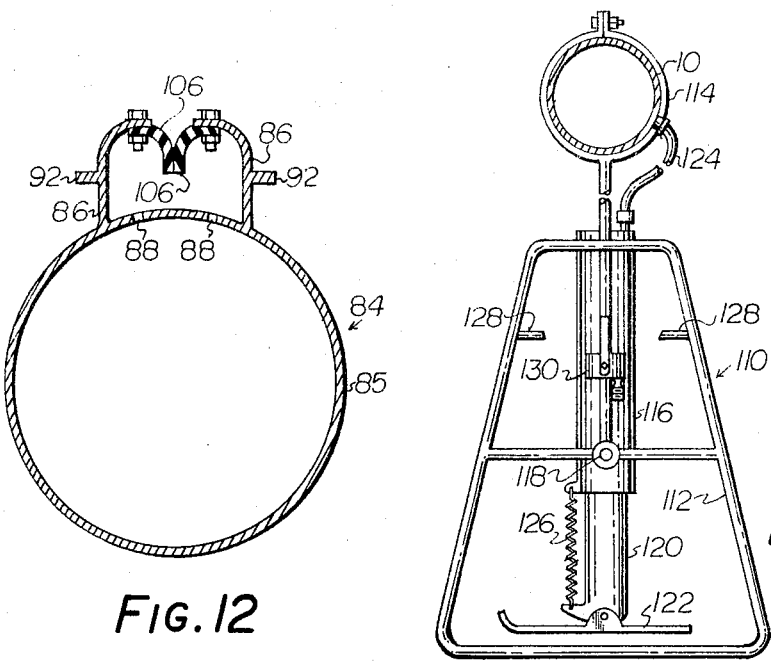

United States Patent Office 3,268,174
Patented August 23, 1966

3,268,174
IRRIGATION SYSTEM
Ralph D. Boone, 2920 Axtell, Clovis, N. Mex.
Filed Sept. 27, 1963, Ser. No. 312,109
15 Claims. (Cl. 239—212)

This invention relates to agricultural irrigation and more particularly to a system for moving irrigation sprinkler pipe.

Sprinkling is a common method agricultural irrigation. The water is conveyed through pipes to the area to be irrigated and discharged by sprinklers onto the land. After the land is irrigated, the pipe with sprinklers is moved to another area and then the water is sprinkled on that land. The pipe may be moved continuously so that the sprinklers move slowly from one area to the next or it may be that one area is watered, the water turned off, and the pipe moved to another area.

In moving the sprinkler pipe continuously, difficulty is experienced in forming a joint to transmit the water from a stationary pipe into the moving sprinkler pipe. This is accomplished in commercial systems by having the sprinkler pipe swing about one end in the form of a circle. This has the obvious disadvantage that the area watered is a circular area whereas most agricultural fields are rectangular. I have solved this problem by providing the improved means for transferring water from a fixed pipe to the sprinkler pipe.

It is desirable to reduce the expense of the mechanism or vehicles by which the pipe is moved. I have invented an inexpensive mechanism for this purpose.

An object is to provide a means for moving the sprinkler pipe.

A further object is to provide a means for maintaining the pipe in alignment as it is being moved.

A further object is to provide means for detecting misalignment in the pipe to the ends that this misalignment may be corrected. Naturally any system which maintains alignment must detect the misalignment before a correction can be applied.

A further object is to provide supports between moving vehicles which support the pipe at all times, and likewise provide for alignment of the pipe while it is being moved. These supports do not actually move the pipe, but permit it to be moved while they are supporting same.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawing, the different views of which are not necessarily to the same scale, in which:

FIG. 11 is a side elevational view of the mechanism shown in FIGS. 8, 9, and 10.

FIG. 12 is a view similar to FIG. 8 without the spear mechanism showing a modified form of the seal.

FIG. 13 shows a modified form of slave vehicle from that shown in FIGS. 5 and 7.

Figure 1:
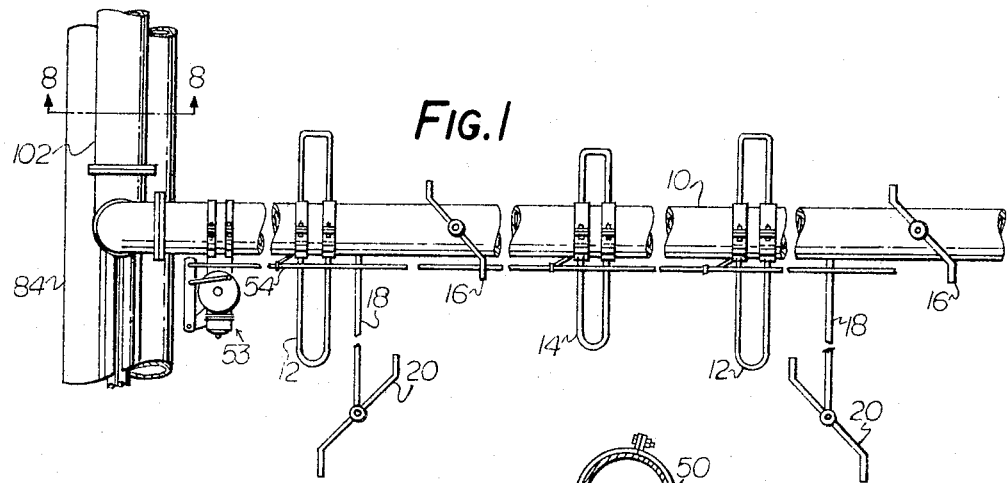
FIG. 1 is a top view showing the entire system broken in places for clarity of illustration.
Figure 2:
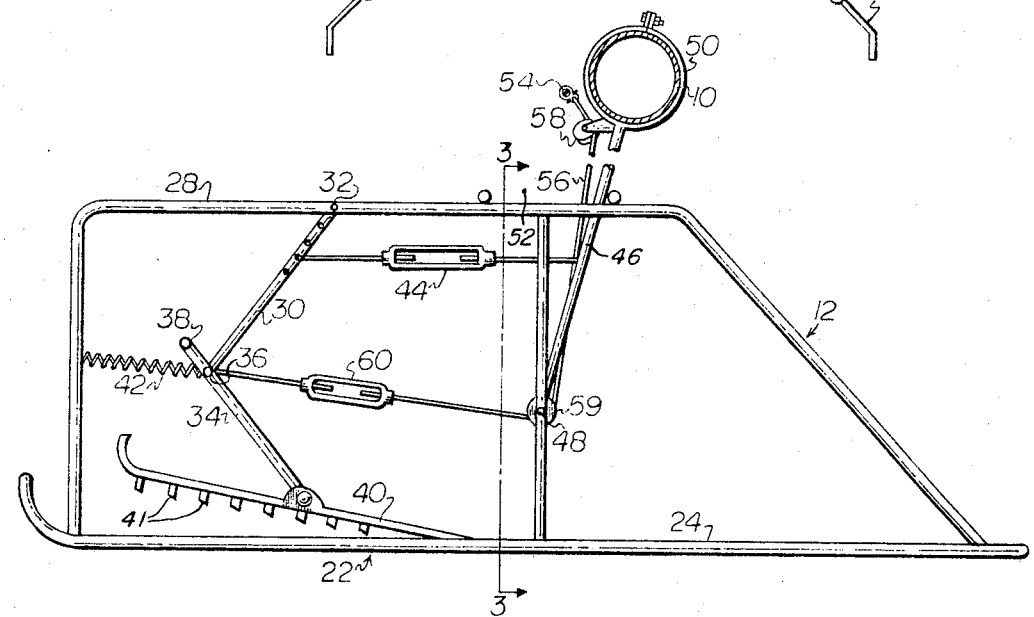
FIG. 2 is a side elevational view of one of the moving vehicles.
Figure 3:
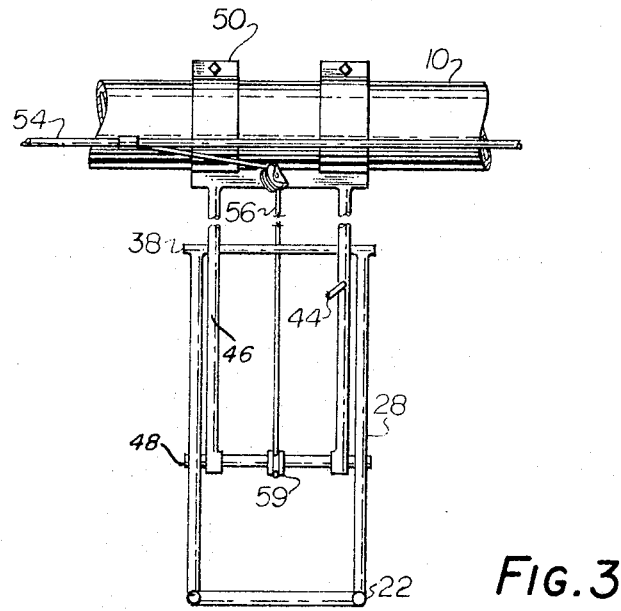
FIG. 3 is a sectional view of the moving vehicle taken on line 3—3 of FIG. 2.
Figure 4:
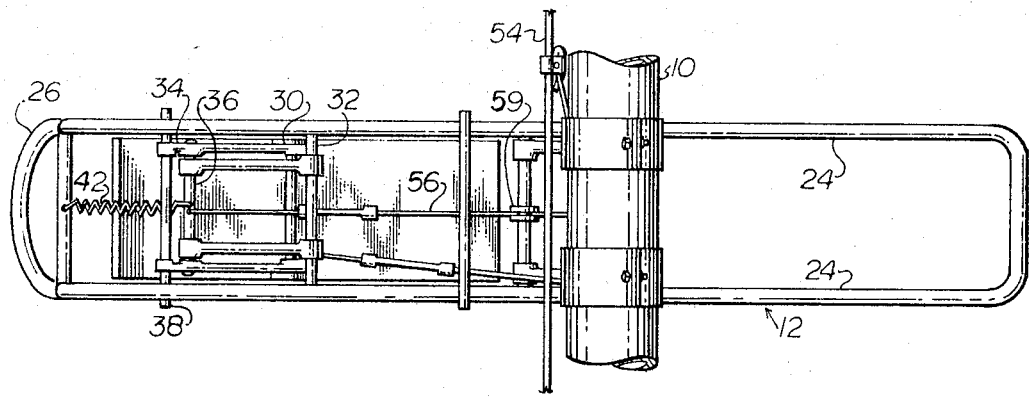
FIG. 4 is a top view of the moving vehicle.
Figure 5:
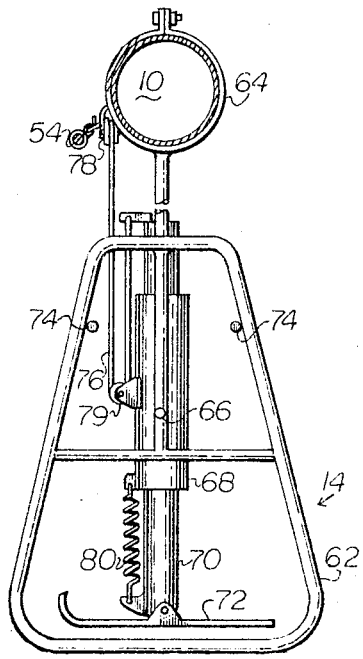
FIG. 5 is a side elevational view of one of the slave vehicles.

Referring to the drawings (FIG. 1), it will be seen that the sprinkler pipe 10 is supported by a plurality of principal or moving vehicles 12 and supplementary or slave vehicles 14. The sprinkler pipe has a plurality of sprinklers 16 attached thereto for discharging water from it and also as illustrated has a plurality of trail tubes 18, each trail tube having at least one sprinkler 20 attached thereto.

It will be understood that the trail tubes 18 with their sprinklers 20 might not be used if it were desired to have the system moving continuously at all times. Or the sprinklers 16 could be eliminated so that the vehicles are always on dry ground.

In any event, the trail tubes 18 and sprinklers 20 will form a plurality of means for distributing water from the sprinkler pipe 10 onto the land to be watered.

Referring more particularly to the vehicles 12 (FIGS. 2–5), it will be noted that the vehicle frame is made of bent tubing. One of the principal parts of the bent tubing frame is runner 22 which has the two longitudinally extending elements 24 which are connected by bight 26 at the forward end. It will be noted that the forward end of the bight 26 extends upward so that the runner 22 tends to climb over trash or debris rather than being embedded therein or embedded in irregularities of the land. The frame of the vehicle 12 also includes support 28 extending from the forward end of the runners 22 to the rear end thereof. As may be seen in referring to the drawings, the support 28 extends upward and above the runners 22.

It will be understood that the runners 22 need not be continuous. An alternate form is that there could be a front runner and a trailing runner. Since the system is an integral system, the trailing runner could be formed by the trail tube 18 being bent downward rearwardly from the pipe 10 so that it engaged the ground at a desired rearward point.

Leg 30 is pivoted at point 32 by use of a bolt, to the support 28 toward the forward portion thereof. The leg 30 extends downward from the support 28. Shank 34 is pivoted at knee 36 to the bottom of the leg 30 and extends downward therefrom. The top of the shank 34 extends upward from the knee 36 and has stop 38 at the top thereof. Therefore, it may be seen that the shank 34 may rotate about the knee 36 so that the bottom of the shank may swing rearwardly from the knee, but the shank cannot swing forward from the knee. Foot 40 is attached to the bottom of the shank 34. The foot 40 is pivoted to the shank 34 forward of the center of gravity of the foot so that the forward portion of the foot, when the foot is raised, will be above the ground although the rear of the foot may drag on the ground. The foot 40 has a plurality of cleats 41 on the bottom of it to prevent slippage along the ground. The foot 40 is located between the two long elements 24 and in its forward position of the foot 40, is adjacent but behind the bight 26. Spring 42 extends from the leg 30 to the support 28 in front of the leg 30 so that the leg 30 is biased forward by the spring 42.

Means for swinging the leg 30 to the rear is provided. This means is more fully described later.

Therefore, it may be seen that if the means for swinging the leg 30 rearward is relaxed, that the leg 30 will be in the forward position due to the influence of the spring 42. The length of the shank 34 and the location of the pivot 32 is so arranged that the foot 40 is above or about level with the runners 22 in this position. Therefore, when the means for moving the leg 30 rearward is actuated, the rearward movement of the leg will cause the foot 40 to contact the ground. Further rearward movement of the leg 30 will cause the knee 36 to straighten and the stop 38 on the top of the shank 34 to contact the leg 30 so that further rearward movement of the leg 30 will cause rearward movement of the foot 40. This mechanism could alternately be described as a toggle. However, the initial movement of the leg 30 will cause the elevation of the frame of the vehicle 12 so that subsequent rearward movement of the leg 30 will cause a forward propulsion of the vehicle. The pivot 32 is attached to the support 28 forward of the center of gravity of the entire vehicle 12 with pipe 10 so that when the front of the vehicle 12 is elevated on the initial rearward movement of the leg 30 the bight 26 is lifted from the ground and the rear end of the runners 22 drag or trail along the ground.

Upon the completion of the rearward movement of the leg 30, the means for moving the leg 30 is relaxed permitting the leg 30 to be moved forward by the spring 42. As the spring 42 moves the leg 30, the contact of the foot 40 with the ground will cause a rotation of the shank 34 at the knee 36, therefore permitting the foot 40 to drag lightly along the ground while the vehicle 12 rests upon the runners 22. Thus it may be seen that upon a reciprocation or oscillation of the leg 30, the vehicle 12 and pipe 10 are moved forward.

The forward movement of the leg 30 is limited by link 44 in this embodiment in the form of a cable. The link 44 is attached to the stanchion 46, the lower end of which is pivoted at 48 to the frame of vehicle 12. The sprinkler pipe 10 is clamped within clamp 50 on the upper end of the stanchion 46. The stanchion 46 is free to move forward and back a limited amount within the slot 52 within the support 28. The stanchion 46 is vertical when it is in the middle of the slot 52 and only slightly deviated from vertical when it is either in the forward or rearward portion of the slot 52.

As stated previously, the forward movement of the leg 30 is limited by the link 44 which in turn is connected to the stanchion 46. Therefore, if the stanchion 46 is in the forward position as allowed by the slot 52, the leg 30 may move to the full degree forward and therefore, when it is moved rearwardly by the means for rearward movement, the leg 30 moves to a full travel. However, should the stanchion 46 be in the rearward part of the slot 52, the link 44 will limit the forward travel of the leg 30 and therefore limit the total movement of the leg 30, therefore limiting the movement of the vehicle 12.

Therefore, it may be seen that if several such vehicles 12 are attached to the sprinkler pipe 10 and that if one vehicle falls behind in the general line of vehicles, that the sprinkler pipe 10 will move forward therefore moving the stanchion 46 forward in the slot 52 so as to permit the leg 30 to move the vehicle forward to the greatest degree possible. However, should a particular vehicle get ahead of the other vehicles in the line of vehicles attached to the sprinkler pipe 10, the sprinkler pipe 10 will cause the stanchion 46 to be moved to a rear position in the slot 52 which due to the action of the link 44, will cause the vehicle to make a less amount of forward travel for each activation of the means for moving the leg 30. Thus it may be seen that I have provided a means for aligning the various vehicles on the sprinkler pipe 10.

Of course the connection between the stanchion 46 and the leg 30 has been described as a link 44. However, in a broader sense, it will be understood that the stanchion provides for movement of the sprinkler pipe 10 forwardly or rearwardly on the vehicle 12 and as such therefore, provides a means for detecting if the vehicles are misaligned. Also, it may be seen that the link 44 is a means responsive to this misalignment for adjusting the amplitude of the reciprocation of the leg and thus the movement of the vehicle.

It will be understood that the knee 36 could be reciprocated or oscillated rearwardly by any of several means. E.g. it could be moved rearwardly by a hydraulic cylinder operated by water pressure within the irrigation pipe 10 or by water pressure moving through a separate pipe such as the system disclosed by Gaskill in U.S. Patent 2,940,672. Or the reciprocation could be caused by a rotating shaft as disclosed by Bevill in U.S. Patent 959,914. In case a rotating shaft were used, it would be necessary to connect a crank and pitman from the shaft. The pitman would of necessity be slotted so that as to provide for a different forward movement inasmuch as the forward movement of the leg 30 will depend upon the position of the link 44. Or rather than having the shaft a separate rotating shaft, it would be possible to transmit power through the sprinkler pipe 10 by mounting it for rotation so that an eccentric were connected around the sprinkler pipe 10 to cause the oscillating movement of the leg 30. An electric solenoid could be utilized to reciprocate leg 30. However, the preferred system and that illustrated, is by use of cable 54. As may be seen, the cable 54 extends the entire length of the sprinkler pipe 10. At one end of the pipe 10, the cable 54 is caused to reciprocate by means 53.

Inasmuch as means 53 for causing a cable to reciprocate is simple and will be well known to the art, it is not illustrated or described further except that typical means is shown involving an oscillating arm pivoted at one point with cable 54 connected to the arm and the arm caused to oscillate by a pitman connected to a rotating crank. At each vehicle 12, flexible operating line 56 is connected to the cable 54. The line 56 reeves through pulleys 58 connected to the clamp 50 and pulley 59 connected to the support 28 of the frame of the vehicle 12. The line 56 extends to the leg 30. Turnbuckle 60 attaches between the leg 30 and the line 56 so that the movement of each of the legs may be balanced for the various vehicles 12. Therefore, it may be seen that if the cable 54 is periodically tensioned that the tension will be transmitted through each of the lines 56 and through the turnbuckle 60 and therefore, cause the leg 30 to reciprocate or oscillate. On the other hand, when the cable 54 is relaxed, the spring 42 will return the leg 30 to its forward position and also will move the cable 54 to an extreme position.

Therefore, it may be seen that I have provided a system for moving the sprinkler pipe 10. The pipe 10 may be moved slowly wherein the irrigation continues continuously from the pipe 10 or the system may be used for intermittent moving and watering. I have provided an inexpensive mechanism for moving the pipe and keeping it aligned while it is being moved.

Figure 6:
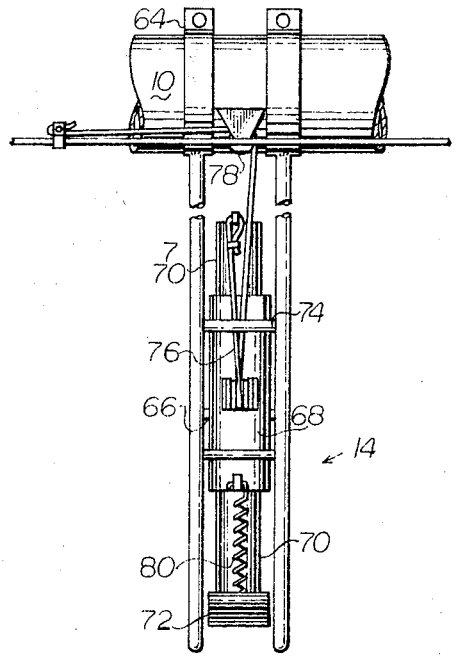
FIG. 6 is a front view of the slave vehicle shown in FIG. 5.
Figure 7:
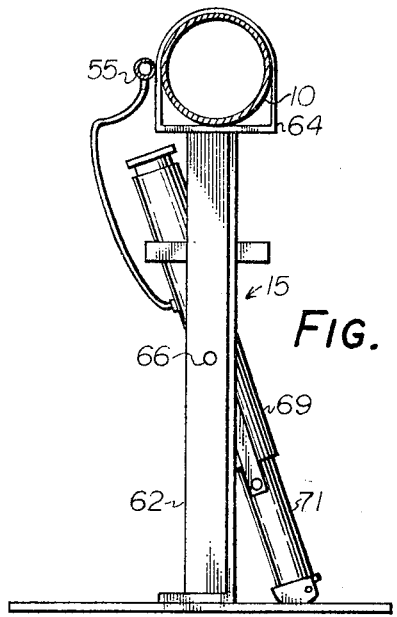
FIG. 7 is a side elevational view of a modified form of slave vehicle.
Figure 9:
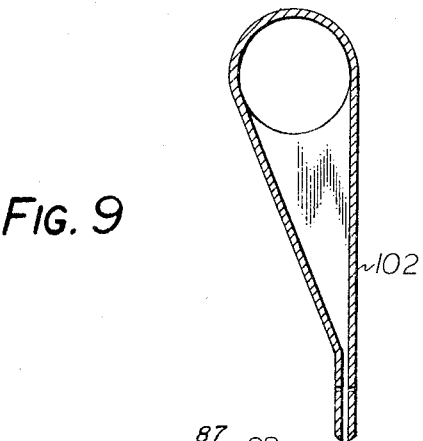
FIG. 9 is a sectional view similar to FIG. 8 on a smaller scale showing the spear only.

The slave vehicles 14 (FIGS. 6 and 7), between the main vehicles 12 support the pipe 10 at all times and to permit it to be aligned wherever it might be. Each slave vehicle 14 has frame 62 which has at its upper end clamp 64 by which the sprinkler pipe 10 is attached to the frame 62. The bottom of the frame 62 has sufficient area to prevent it from sinking into the mud. Pivot 66, intermediate of the top and bottom of the frame 62 is used to attach sleeve 68 to the frame. Arm 70 is mounted for reciprocal motion in a general vertical direction within the sleeve 68. Foot 72 is mounted on the bottom of the arm 70 and pivoted so that when the foot is pressed against the ground that it does not restrict the movement of the arm. Means described later are provided for pushing the arm 70 downward in the sleeve 68 so as to raise the frame 62 from the ground. Stops 74 are provided on the frame which limit the pivoting motion that the sleeve 68 has relative to the frame.

Specifically describing the operation, if the foot 72 is in the raised position, the pipe 10 is supported by the frame 62. However, when the arm 70 is forced downward, this will lift the frame 62 from the ground and if the pipe 10 is urged to move normal to its axis, there is no restraint upon the pipe moving either forward or back until the sleeve 68 hits one of the stops 74, thus limiting its motion. Therefore, if the slave vehicle 14 is located between two of the moving vehicles 12 it will maintain alignment although it will not move the pipe of its own accord. It will be noted that this slave vehicle 14 is particularly adapted for any means of forcing the foot 72 and arm 70 down relative to the sleeve 68. Particularly it could use a hydraulic piston to do this or rotational movement of a shaft or pipe. Illustrated is a cable system whereby line 76 is attached to the cable 54 which is attached along the pipe 10. The line 76 is reeved around pulley 78 which is attached to clamp 64 and through pulley 79 attached to sleeve 68. The end of the line 76 is attached securely to the arm 70 above the pulley 79. Therefore, when the cable 54 is tensioned, the line 76 moves the arm 70 downward relative to the frame 62 and the sleeve 68, lifting the frame 62 from the ground. At any time the frame 62 is suspended from the ground and the vehicle 14 and pipe 10 is supported by the arm 70 and the foot 72, the pipe moves to a position of alignment with the rest of the pipeline until the sleeve 68 strikes one or the other of the stops 74. Of course, at the time the cable 54 is relaxed, the weight of the mechanism will cause the frame 62 to rest against the ground. Spring 80 is provided from the arm 72 so that it can swing free and be in vertical position when the weight of the vehicle is supported by the frame 62. The sleeve 68 is erected by having the center of gravity below the pivot point 66. If desired, additional springs may be provided on either side of sleeve 68 to aid in the erection of the sleeve 68 when the foot 72 is not in contact with the ground.

Therefore, it may be seen that the slave vehicle 14 will provide vertical support for the pipe 10, but will not limit its movement to the horizontal direction normal to the axis of the piper 10. A purpose of using the supplementary or slave vehicles 14 is that they can be constructed for considerably less cost than the principal vehicles 12 and therefore, provide auxiliary support between the vehicles 12 and enable the complete system to be constructed for less money.

Figure 8:
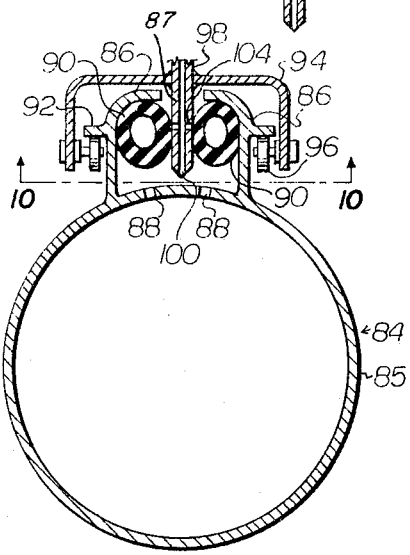
FIG. 8 is a partial sectional view taken on line 8—8 of FIG. 1 showing the joint between the main pipe and the sprinkler pipe.

FIG. 8 shows an alternate slave vehicle 15. The alteration is a hydraulic cylinder rather than a cable system. It is meant to be illustrative not only of how a hydraulic cylinder could be substituted within a slave vehicle 14, but also is meant to illustrate how the hydraulic system could be substituted for the means for moving leg 30 rearwardly in the moving vehicle 12.

As may be seen, the slave vehicle 15 uses a similar frame 62 and clamp 64 at the top and has sleeve 69 pivoted to the frame at 66. However, in this case the sleeve 69 is the cylinder of a hydraulic motor and the arm 71 is the rod extending from a piston contained within the cylinder 69 of the hydraulic motor. In such case, the arm 71 is forced down by water pressure within the sleeve 69 when pressure is supplied to the sleeve 69 through an auxiliary pressure line 55 attached to a sprinkler pipe 10. As is described in the Gaskill U.S. Patent 2,940,672, the pressure is intermittently forced into the line 55 therefore, providing pressure for the hydraulic motor. Therefore, it may be seen that the means for operating the leg 30 or the arm 70 may be any of numerous means, the cable being the preferred and illustrative means.

FIG. 13 illustrates another embodiment of a slave vehicle 110. The purpose of the slave vehicle is likewise to support the sprinkler pipe 10 and it has a frame 112 which is attached to the pipe 10 by clamp 114. It also has sleeve 116 pivoted at point 118 to the frame 112. The pipe would be supported by the frame 112 unless arm 120 having foot 122 on the bottom thereof were extended. The arm is extended by water pressure from pipe 10 being conducted through tube 124 which interconnects the pipe 10 to the sleeve 116 which again is in the form of the cylinder of a hydraulic motor. The arm 120 is connected to a piston within the sleeve 116. The arm and foot are retracted to a carrying position by spring 126. The tube 124 is of small diameter so that it acts as an orifice or a choke to cause the water to flow from the pipe 10 into the sleeve 116 at a slow rate. There is a valve actuator associated with stops 128 upon the frame 112 so that when the sleeve contacts the stops that they actuate valve 130. When the valve 130 on the sleeve 116 is actuated, it releases a pressure within the sleeve permitting the spring 126 to retract the foot 122. Therefore, the weight of the foot and arm will return the sleeve to a vertical position before the water flowing slowly through the tube 126 again extends the foot 122 to an extended and supporting position. It will be understood that when the pipe 10 is supported by the foot 122 and arm 120 the frame 112 extends above the ground.

To move the water from the main pipe 82 into the sprinkler pipe 10, a special section or conduit 84 is provided. This special conduit 84 includes pipe 85 with a hood on its top formed by two J-shaped longitudinally extending elements 86 attached to the pipe 85. The J-shaped elements 86 are attached by welding the pipe 85 with the long leg of the J shape welded. They face one another so as to form a nearly closed slot 87 between them. The pipe 85 has a plurality of perforations 88 opening into this hood formed by the two J-shaped elements 86. The water is contained within the hood by seals 90 illustrated in FIGS. 8 and 10 as being flexible, pliant, tubes containing pressurized fluid. It will be noted that the water within conduit 84 presses behind the seals 90 so that the water pressure gives some aid in keeping a fluid tight seal.

Flanges 92 extend along each side of the hood. The flanges 92 are welded to the J-shaped elements 86. Carriage 94 is mounted to move along the flanges 92 and is provided with a plurality of wheels 96 for this purpose. The carriage has hollow spear 98 mounted thereon. The spear 98 extends through the slot between the J-shaped elements 86. The seals 90 form a fluid tight seal around the spear 98. It will be noted that the spear 98 is elongated in the direction of the slot and it has sharp edges 99 at either end to aid both in the movement of the spear along the slot and for the effectiveness of the fluid tight seals 90 upon either side and the front and the rear thereof. The spear 98 has an opening 100 in the bottom thereof for water passage into it and has a transition 102 on the part that extends out of the hood for moving the water from within the spear 98 to the sprinkler pipe 10. The sprinkler pipe 10 is connected in a fluid transmitting relationship to the transition 102. Also the spear 98 has a number of small holes 104 in the side of it opposite the seals 90. This forms two purposes, one of which is to equalize the pressure of the seals 90 against the side of the spear 98 so as to prevent excessive pressure of the seals against the spear increasing the frictional drag of moving the spear along. In addition to this, the holes 104 permit a small amount of water to pass through the spear 98 and thus wet the seal 90 to provide a certain amount of lubrication to this area. It is contemplated of course, that the seals 90 would be made of a rubberlike material and we have found that water is an effective lubricant.

FIG. 12 illustrates another embodiment of the seals which are formed in the top of the conduit 84. In this case, the seals are each formed by a rubber like flap or belt 106. There are two of these flaps 106 each of which is attached to one of the J-shaped elements 86 by bolting or otherwise. Normally, each of the flaps would extend across the slot between the two J-shaped elements. However, they are bent so that they extend down into the hood and the water pressure within the hood forces them together to form a fluid-tight seal sealing both the contents of the conduit 84 and also sealing the joint between the conduit 84 and the spear 98.

Figure 10:
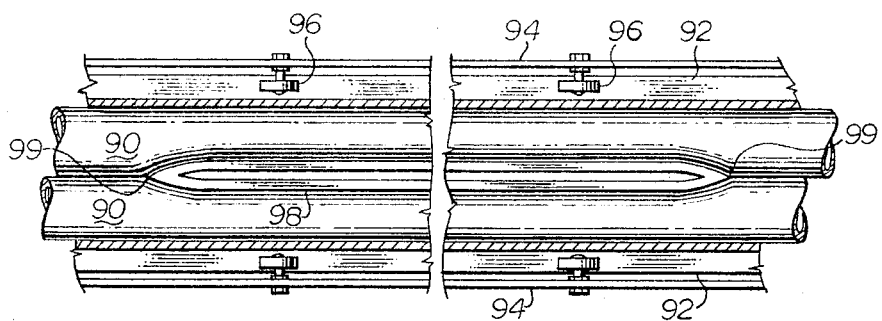
FIG. 10 is a sectional view taken on line 10—10 of FIG. 8.

The tube type seals 90 which are illustrated in FIGS. 8 and 10 are the preferred type because they are easier to install and replace in the event of repairs.

Therefore, it may be seen that the special conduit 84 is a means for supplying water under pressure to the sprinkler pipe 10. Of course, it will be obvious that other means for supplying water to the sprinkler pipe 10 could be used. Particularly obvious are those wherein there is a discontinuity of supply.

It will be apparent that the embodiments shown are only exemplary and that various modifications can be made in construction, materials, and arrangement within the scope of the invention as defined in the appended claims.

I claim as my invention:

1. In an improved vehicle for use in an irrigation system having
    (a) a water sprinkler pipe,
    (b) said sprinkler pipe adapted to carry a plurality of means for distributing water from the pipe to the land to be watered,
    (c) means for delivering a supply of water under pressure to said pipe, and
    (d) a plurality of vehicles spaced along said pipe supporting same;
the improved vehicle comprising:
    (e) a frame having
    (f) a ground engaging element,
    (ff) said vehicle having a center of gravity
    (g) a foot
    (h) attached to the frame a substantial distance forward of the center of gravity of the vehicle, and
    (i) means for moving the foot downward and rearward below the element taking a predetermined amount of weight onto the foot and off the element resulting in the movement of the forward end of the element upward and forward and thus moving the vehicle and pipe forward.

2. The invention as defined in claim 1 wherein said means for moving said foot downward and rearward includes
    (j) a cable extending along said pipe,
    (k) means for reciprocating said cable, and
    (l) a line extending from said cable to the attachment of the foot to the vehicle.

3. In an improved vehicle for use in an irrigation system having
    (a) a water sprinkler pipe,
    (b) said sprinkler pipe adapted to carry a plurality of means for distributing water from the pipe to the land to be watered,
    (c) means for delivering a supply of water under pressure to said pipe, and
    (d) a plurality of vehicles spaced along said pipe supporting same;
the improved vehicles comprising:
    (e) a frame having a ground engaging element,
    (f) said vehicle having the center of gravity,
    (g) a foot attached to the vehicle a substantial distance forward of the center of gravity of the vehicle, and
    (h) means for moving the foot downward and rearwardly below the element taking a predetermined amount of weight onto the foot and off the element resulting in the movement of the forward end of the element upward and forward and thus moving the vehicle and the pipe forward, said attachment of the foot to the frame including,
    (i) a shank attached to the foot,
    (j) a leg pivoted at one end to the shank,
    (k) a stop on the shank to limit the pivoting of the shank
    (l) said leg pivoted at the other end to the frame forward of the center of gravity of the vehicle, and
    (m) means for moving the foot downward and rearward including means for reciprocating the leg, so that a predetermined amount of weight of the frame is shifted to the foot until the stop engages and thereafter the frame is moved forward.

4. The invention as defined in claim 3 wherein said means for reciprocating the leg includes
    (n) a cable extending along the pipe,
    (o) means for reciprocating the cable, and
    (p) a line extending from the cable to the leg.

5. The invention as defined in claim 3 with the addition of
    (n) means for detecting if the vehicle is forward of other vehicles attached to the pipe, and
    (o) a link interconnecting the means for detecting and the leg, so arranged and constructed that if the vehicle is forward of other vehicles the movement of the leg is restricted, thus restricting the total length of reciprocation of the leg thus restricting the movement of the foot and the vehicle.

6. The invention as defined in claim 5 wherein the means for detecting also provides a
    (p) means for mounting the pipe to the frame for relative movement in a forward or backward direction.

7. In an improved vehicle for use in an irrigation system having
    (a) a water sprinkler pipe,
    (b) said sprinkler pipe adapted to carry a plurality of means for distributing water from the pipe to the land to be watered,
    (c) means for delivering a supply of water under pressure to said pipe, and
    (d) a plurality of said vehicles spaced along said pipe supporting same;
the improved vehicle comprising:
    (e) means interconnecting the vehicle and pipe for detecting if the vehicle is forward of other vehicles attached to the pipe,
    (f) means for moving the vehicle,
    (g) said means for moving the vehicle including a member mounted for reciprocation, the movement of the vehicle being responsive to said reciprocation, and
    (h) means responsive to said means for detecting for limiting the amplitude of reciprocation thus limiting the movement of said vehicle.

8. The invention as defined in claim 7 wherein the means for detecting also provides a
    (i) means for mounting the pipe to the frame for relative movement in a forward or backward direction.

9. In an irrigation system having
    (a) a water sprinkler pipe,
    (b) said sprinkler pipe adapted to carry a plurality of means for distributing water from the pipe to the land to be watered,
    (c) means for delivering a supply of water under pressure to said pipe, and
    (d) a plurality of vehicles spaced along said pipe supporting same;
the improved vehicle comprising:
    (e) a frame,
    (f) means for mounting the pipe on the frame for forward or rearward movement with respect to the frame,
    (g) means for detecting if the pipe is forward or rearward of a middle position, and
    (h) means for adjusting the movement of the vehicle responsive to said means for detecting.

10. In an irrigation system having
    (a) a plurality of vehicles spaced along a sprinkler pipe supporting same; and
    (b) each vehicle having a ground engaging runner;

the improved method of moving each vehicle comprising: repeatedly
- (c) lifting the forward end of the runner,
- (d) moving the forward end forward and
- (e) setting the forward end down, while
- (f) dragging the trailing end of the runner at all times.

11. In an irrigation system having
- (a) a plurality of said vehicles spaced along a sprinkler pipe supporting same;
- (b) each vehicle having an element mounted for reciprocation and
- (c) means for moving the vehicle responsive to said reciprocation;

the improved method of maintaining each of said vehicles in alignment comprising:
- (d) detecting if said vehicle is misaligned with other of said vehicles, and
- (e) changing the amplitude of reciprocation of the element mounted for reciprocation responsive to said detected misalignment.

12. In an irrigation system having
- (a) a plurality of vehicle spaced along a sprinkler pipe supporting same;

the improved method of detecting misalignment of a vehicle comprising:
- (b) permitting the pipe to move bodily forward or backward to a limited degree on the vehicle and
- (c) determining if the pipe is forward or backward of a middle position.

13. In an irrigation system having
- (a) a water sprinkler pipe,
- (b) said sprinkler pipe adapted to carry a plurality of means for distributing water from the pipe to the land to be watered,
- (c) means for delivering a supply of water under pressure to said pipe, and
- (d) a plurality of vehicles spaced along said pipe supporting same;

the improvement comprising in combination:
- (e) each of said vehicles having a frame with
- (f) a ground engaging element,
- (g) a foot
- (h) a shank pivoted to the foot,
- (i) a leg pivoted at one end to the shank,
- (j) said leg pivoted at the other end to the frame,
- (k) means for reciprocating the leg thus moving the foot downward and rearwardly below the element thus moving the forward end of the element upward and forward and thus moving the vehicles and pipe forward;
- (l) a stanchion pivoted to each vehicle,
- (m) said water distributing pipe clamped to the stanchion so that the pipe can move forward or backward on the vehicle,
- (n) a link connecting the stanchion to the leg so that if the stanchion is not in its forwardmost position, the forward movement of the leg is restricted by the link interconnecting the stanchion and leg thus restricting the movement of the foot;
- (o) a cable extending along the pipe,
- (p) means for reciprocating the cable,
- (q) a line extending from the cable to the leg so that reciprocation of the cable causes reciprocation of the leg;
- (r) a support attached to the pipe between the vehicles,
- (s) means for extending the support to a pipe supporting position, and
- (t) means for retracting the support to a position to be carried by the pipe,
- (u) said means for extending the support responsive to the reciprocation of said cable.

14. In an agricultural irrigation system having
- (a) a water sprinkler pipe,
- (b) said sprinkler pipe adapted to carry a plurality of means for distributing water from the pipe to the land to be watered,
- (c) a plurality of vehicles spaced along said pipe supporting same, the improvement comprising in combination:
- (d) each vehicle having a frame with
- (e) a ground engaging runner,
- (f) a foot
- (g) attached to the frame,
- (h) means for moving the foot downward and rearwardly below the runner, thus moving the forward end of the runner upward and forward and thus moving the vehicle and pipe forward,
- (i) an elongated fluid conduit,
- (j) a slot continuously extending along the conduit,
- (k) a hollow spear extending through the slot thus permitting a fluid passage from within the conduit through the spear,
- (l) a flexible seal extending along the slot forming a fluid tight joint along the slot and between the slot and spear,
- (m) said spear attached to said water sprinkler pipe so as to form a fluid passage from the spear to the pipe and also to provide means for moving the spear along the conduit.

15. In an improved vehicle for use in an irrigation system having
- (a) a water sprinkler pipe,
- (b) said sprinkler pipe adapted to carry a plurality of means for distributing water from the pipe to the land to be watered,
- (c) means for delivering a supply of water under pressure to said pipe, and
- (d) a plurality of vehicles spaced along said pipe supporting same;

the improved vehicle comprising:
- (e) a frame having
- (f) a ground engaging element,
- (g) a foot,
- (h) at least one shank attached to the foot,
- (i) a leg pivoted at one end to the shank,
  - (ii) a stop on the shank to limit the pivoting of the shank,
- (j) said leg pivoted at the other end to the frame, and
- (k) means for reciprocating the leg so that the foot moves downward and rearward, thus moving the frame forward.

References Cited by the Examiner

UNITED STATES PATENTS

| | | | |
|---|---|---|---|
| 466,187 | 12/1891 | Sauer | 239—199 |
| 1,419,925 | 6/1922 | Heine | 239—177 |
| 1,511,960 | 10/1924 | Goldschmidt | 180—8.2 |
| 1,706,932 | 3/1929 | McCormack et al. | 280—12.11 |
| 1,966,783 | 7/1934 | Balaam | 239—212 |
| 2,604,359 | 7/1952 | Zybach | 239—177 |
| 2,628,863 | 2/1953 | Maggart | 239—212 |
| 2,726,895 | 12/1955 | Behlen | 239—212 |
| 2,796,292 | 6/1957 | Maggart | 239—213 |
| 2,798,506 | 7/1957 | Baker et al. | 137—580 |
| 2,800,364 | 7/1957 | Dick et al. | 239—212 |
| 2,892,593 | 6/1959 | Smeltzer | 239—177 |
| 2,893,643 | 7/1959 | Gordon | 239—177 |
| 2,941,727 | 6/1960 | Zybach | 239—212 |
| 3,001,721 | 9/1961 | Zybach | 239—177 |
| 3,019,813 | 2/1962 | Dommann | 137—580 |

FOREIGN PATENTS

| | | |
|---|---|---|
| 527,482 | 7/1921 | France. |
| 414,551 | 6/1925 | Germany. |

M. HENSON WOOD, JR., *Primary Examiner.*

EVERETT W. KIRBY, *Examiner.*

D. L. MOSELEY, R. S. STROBEL, *Assistant Examiners.*